March 12, 1957  G. BLAIR  2,785,268
AUTOMATIC STOVE
Filed May 17, 1954  2 Sheets-Sheet 1
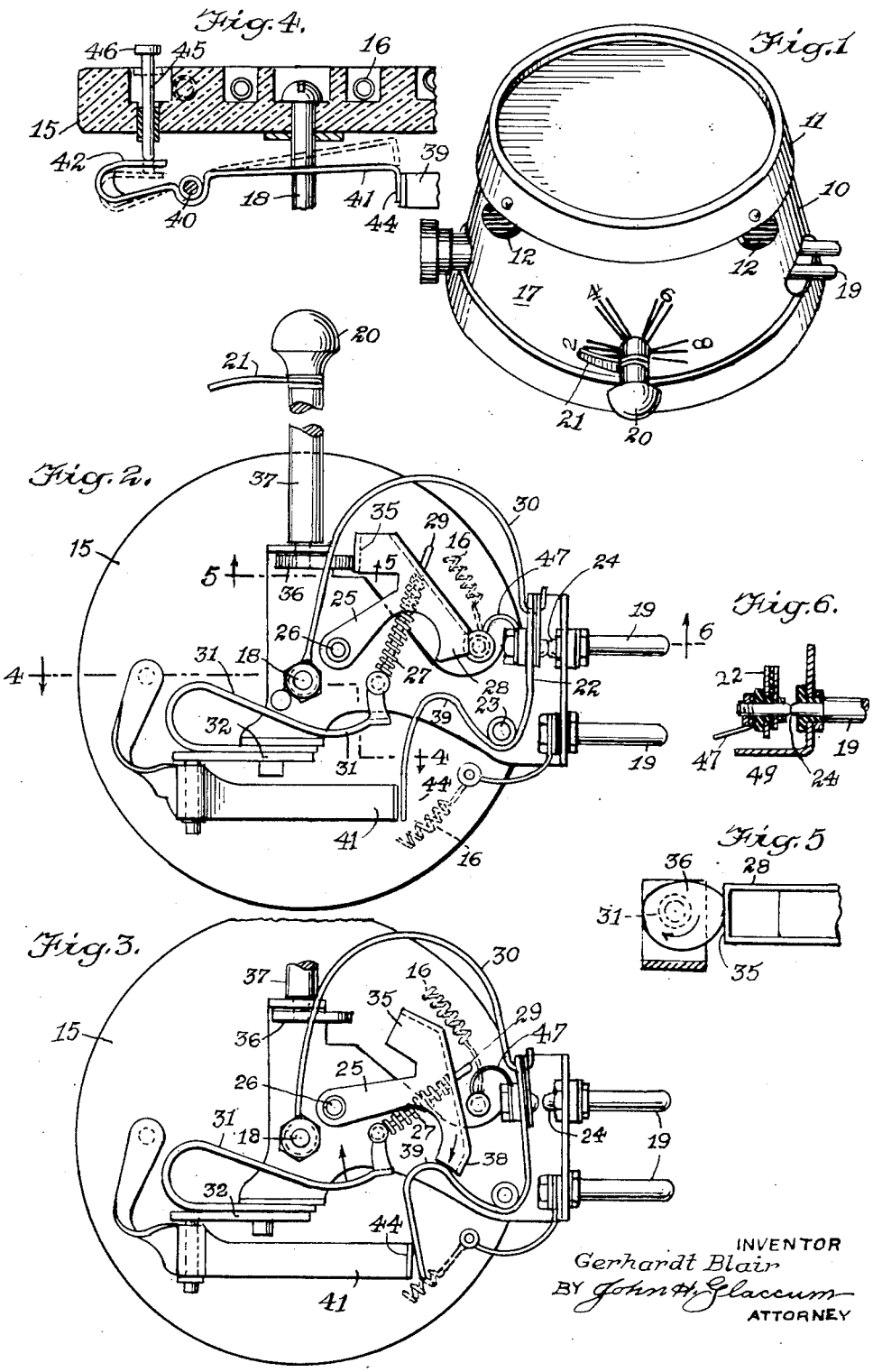
INVENTOR
Gerhardt Blair
BY John H. Glaccum
ATTORNEY March 12, 1957 G. BLAIR 2,785,268
AUTOMATIC STOVE
Filed May 17, 1954 2 Sheets-Sheet 2

INVENTOR
Gerhardt Blair
BY
John H. Glaccum
ATTORNEY

United States Patent Office 2,785,268
Patented Mar. 12, 1957

2,785,268

AUTOMATIC STOVE

Gerhardt Blair, New York, N. Y., assignor to Blair Thermostat Products Inc., New York, N. Y., a corporation of New York Application May 17, 1954, Serial No. 430,286

7 Claims. (Cl. 219—37)

This invention relates to a heating apparatus and more particularly to an automatic stove which is designed to cook various products such as coffee or eggs and to automatically turn off at a predetermined time to prevent over cooking or spoilage of the food or receptacle used in cooking.

A further object is to provide an automatic stove which may be set to cook a given amount of food for a given amount of time. In this connection I provide a fully automatic stove which will turn off the current automatically when a desired temperature has been maintained for a required period of time.

A still further object is to provide such a stove in which it is not necessary to disconnect the plug or to operate the switches manually but which will definitely turn off at the proper time and remain off until a receptacle is placed on the stove for further heating.

Purely for the purposes of illustration and not as a limitation I have shown and described my stove as designed to cook or percolate coffee and with a regulator to cook 2, 4, 6 or 8 cups of coffee. Obviously, the time required to cook or percolate eight cups of coffee is considerably more than that required for two cups. Accordingly, I have provided means to set my stove so that it will automatically furnish enough heat to cook the desired number of cups and to automatically turn off at the right time. I further provide a mechanism which will keep the stove warm as long as the cooking receptacle remains on the stove.

Briefly, the invention contemplates the use of a bimetallic thermostat which will throw a toggle arm to operate a switch to disconnect the heating element when the desired temperature is reached. The amount of heat to operate the bi-metallic element differs with the time desired and I provide a control which will move the toggle element into different initial positions so that the movement of the bi-metallic element will vary in accordance with the time desired.

Other objects and advantages of my invention will become apparent from the following descriptions and accompanying drawings in which:

Fig. 1 is a perspective view of a stove embodying my invention.

Fig. 2 is a bottom plan view showing the operating mechanism with the switch in closed position.

Fig. 3 is a view similar to view 1 with the switch in open position.

Fig. 4 is a cross-sectional view taken on the line 4—4 of Fig. 2.

Fig. 5 is a cross-sectional view of a detail taken on the line 5—5 of Fig. 2.

Fig. 6 is a detailed view of the switch mechanism.

Figure 7:
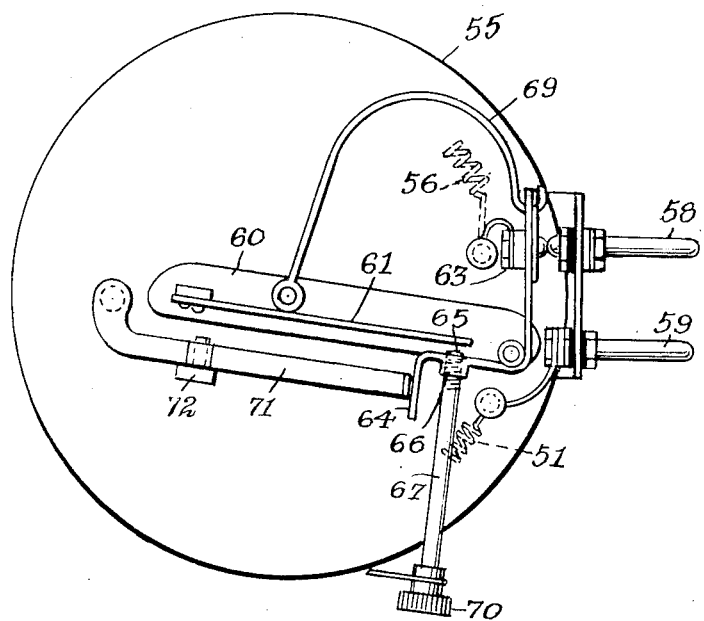
Fig. 7 is a bottom plan view of a modification of my invention.

In Fig. 1 I show the stove 10 with a cover 11 having legs 12 which are adapted to snap the cover into place. In use the cover may be removed and used as a stand for a heating receptacle such as a percolator.

The heating element consists of a conventional ceramic base 15 with resistance coils 16 imbedded therein and is held in place in the casing 17 by means of a bottom plate not shown and the screw 18. Conventional studs 19 receive a conventional plug from a source of current. A control handle 20 with a pointer 21 is provided so that the operator may determine the time within which the current will be on.

As previously stated, I have illustrated my stove as one for making coffee and accordingly in Fig. 1 I have shown the figures 2, 4, 6 and 8 representing the number of cups to be cooked or percolated. However, any suitable graduations may be used depending upon the purpose to which the stove is put.

The studs 19 connect with the heating coil 16 through a switch 22 which is pivoted at 23 so that the contact 24 may be made and broken.

Mounted in the base of the ceramic element is a toggle 25 pivoted at 26 and operated by the spring arm 27 having its end 29 extending through the arm 28 of the toggle. The spring 30 normally presses the end of the switch 22 to close the contact 24. The lower end of the spring arm 27 is engaged by the bi-metallic element 31 which is mounted at 32 to the base of the element 15. One end 35 of the toggle arm 28 normally engages a cam 36 on the end of the shaft 37 which communicates with the handle 20. The turning of the shaft 37 moves the toggle arm 28 a predetermined distance clockwise. When the current is turned on heat is applied not only to the coil 16 but to the bimetallic element 31 which thereupon expands until it trips the toggle 25 clockwise, when the end 38 of the toggle arm engages the shoulder 39 of the switch 22 to break the contact as shown in Fig. 3.

Pivotally mounted at 40 is the arm 41 having a portion 42 bent upon itself and an anchor 44. When the toggle arm moves the switch 22 to the open position gravity will cause the arm 41 to drop and the anchor 44 will engage the switch to hold it in the open position. However, there is a pin 45 with a head 46 which extends above the ceramic body so that as long as there is a cooking utensil on the stove it will engage the head 46 and drop downwardly on the pin 45 which will engage the portion 42 and hold the arm 41 out of position. Accordingly, if a receptacle is left upon the stove after the switch 22 has been opened and the contact 24 is broken, the stove will reheat whenever the temperature falls below the point where the bi-metallic element holds the toggle in the furthermost clockwise position. However, once the receptacle is removed gravity will drop the arm 41 to lock the switch 22 in the open position and will keep the switch open until the receptacle is replaced on the stove.

It will be appreciated that the shape of the cam 36 is such that it will move the toggle progressively so that the amount of movement required by the bimetallic element is reduced or increased in accordance with the position of the cam.

It will be further appreciated that the amount of heat delivered depends upon the position of the cam and that any desired amount can be secured by the presetting of the position of the cam.

The switch member 22 is more clearly shown in Fig. 6. It will be noted that in addition to the contact 24 which connects the wire 47 to the heating element 16, there is a contact point 24 which connects the switch member to the stud 19. In the modification shown in Fig. 7 the studs 58 and 59 are connected to the switch member 63 in the same manner as heretofore described, and the switch 63 is urged into the contact position by means of the spring 69.

Mounted in the base of the heating element is a base plate 60 to which is pivoted a bimetallic member 61. Mounted in the end 64 of the switch 63 is a shaft 67 threaded into the switch member 63 at 66 and having a protruding end 65. A handle member 70 is provided for the rotation of the shaft 67 so that it may be moved toward or away from the bimetallic element 61. When the bimetallic element is heated and moves toward the end 65 of the shaft 67 it pivots the switch member 63 out of engagement to break contact. Naturally, the further the shaft 67 is screwed into the member 64 the smaller the amount of travel required to break the contact, and as the shaft 67 is screwed out of the threaded section 66 the bimetallic element must travel further in order to make contact and open the switch.

The arm 71 pivoted at 72 operates in the identical fashion as the arm 41 and will drop behind the end 64 of the switch member 63 to hold it open when the receptacle is removed from the stove.

In either form of my invention I provide a fully automatic stove which will cook coffee or other material to a predetermined point and then automatically shut off and remain off when the receptacle is removed from the stove and which will resume heating if the temperature is low enough when a receptacle is placed on the stove.

It will be appreciated that my automatic stove may be used with any type of receptacle, whether glass or metal, which can be instantly removed and conveniently washed without the danger now present in conventional coffee makers where the heating unit is integral with the receptacle.

It will also be appreciated that my bimetallic element is not under pressure and can expand lengthwise. In conventional thermostats bimetallic elements are usually kept under continuous pressure in order to make a wider snap to break the circuit. This prevents the bimetallic element from expanding lengthwise and causes metal fatigue. In view of the shape of my switch I get the effect of a multiplication lever which causes a wide separation at the contact point without placing the bimetallic element under pressure.

I claim:

1. An automatic stove including a heating element, a source of current for said heating element, a switch member normally in the closed position, said switch member having an arm, a control shaft threaded into said arm and a bimetallic element having its operating end adjacent said arm whereby the distance between said arm and said bimetallic element may be varied by turning the control shaft.

2. An automatic stove, a heating element therein and a source of current therefor, a switch member, said switch member including a pivoted switch having an arm, a toggle member, a bimetallic member having a pin extending through said toggle member which will trip said toggle as the bimetallic member expands and cause said toggle to engage said arm to open said switch.

3. An automatic stove, a heating element therein and a source of current therefor, a switch member, said switch member including a pivoted switch having an arm, a toggle member, a bimetallic member having a pin extending through said toggle member which will trip said toggle as the bimetallic member expands and cause said toggle to engage said arm to open said switch, and adjustable means for setting the initial position of said toggle member.

4. An automatic stove, a heating element therein and a source of current therefor, a switch member, said switch member including a pivoted switch having an arm, a toggle member, a bimetallic member having a pin extending through said toggle member which will trip said toggle as the bimetallic member expands and cause said toggle to engage said arm to open said switch and adjustable means for setting the initial position of said toggle member, said adjustable means comprising a shaft, and a cam on the end of said shaft engaging said toggle member.

5. An automatic stove including a heating element, a source of current for said heating element, a switch member normally in the closed position, said switch member having an arm, a bimetallic element having its operating end adjacent said arm, means for varying the distance between said arm and said bimetallic element to determine the distance said bimetallic element must travel before it engages said arm to open the switch and additional means for maintaining the switch in the open position.

6. An automatic stove including a heating element, a source of current, a switch member in said source of current, a bimetallic element operatively connected to said switch member to open said switch at a predetermined point and means to vary the distance between said switch member and said bimetallic element, and means for maintaining the switch in the open position, said means comprising a pivoted arm which will drop by gravity to engage said switch in the open position.

7. An automatic stove including a heating element and a source of current, a switch member pivoted underneath said heating element and a bimetallic element adapted to open said switch member and means to hold said switch member in the open position, said means comprising a pivoted arm having a pin extending through said heating element adapted to drop by gravity behind said switch to hold it in the open position but to allow the switch to close when a receptacle is placed on the stove engaging said pin.

References Cited in the file of this patent

UNITED STATES PATENTS

| 1,622,721 | Hook | Mar. 29, 1927 |
| 1,637,155 | Marsden | July 26, 1927 |
| 1,780,462 | Carmean et al. | Nov. 4, 1930 |
| 2,267,546 | Werner | Dec. 23, 1941 |
| 2,426,620 | Koci | Sept. 2, 1947 |

FOREIGN PATENTS

| 600,508 | Germany | July 5, 1934 |